US008670205B1

(12) United States Patent
Malina et al.

(10) Patent No.: US 8,670,205 B1
(45) Date of Patent: Mar. 11, 2014

(54) HYBRID DRIVE CHANGING POWER MODE OF DISK CHANNEL WHEN FREQUENCY OF WRITE DATA EXCEEDS A THRESHOLD

(75) Inventors: James N. Malina, Irvine, CA (US); William B. Boyle, Lake Forest, CA (US)

(73) Assignee: Western Digital Technologies, Inc., Irvine, CA (US)

(*) Notice: Subject to any disclaimer, the term of this patent is extended or adjusted under 35 U.S.C. 154(b) by 585 days.

(21) Appl. No.: 12/894,058

(22) Filed: Sep. 29, 2010

(51) Int. Cl.
*G11B 19/02* (2006.01)
*G11B 21/02* (2006.01)
*G06F 12/00* (2006.01)

(52) U.S. Cl.
USPC ............... 360/69; 360/75; 711/103; 711/112; 711/117

(58) Field of Classification Search
None
See application file for complete search history.

(56) References Cited

U.S. PATENT DOCUMENTS

| | | |
|---|---|---|
| 5,333,138 A | 7/1994 | Richards et al. |
| 5,581,785 A | 12/1996 | Nakamura et al. |
| 5,586,291 A | 12/1996 | Lasker et al. |
| 6,044,439 A | 3/2000 | Ballard et al. |
| 6,115,200 A | 9/2000 | Allen et al. |
| 6,275,949 B1 | 8/2001 | Watanabe |
| 6,429,990 B2 | 8/2002 | Serrano et al. |
| 6,661,591 B1 | 12/2003 | Rothberg |
| 6,662,267 B2 | 12/2003 | Stewart |
| 6,687,850 B1 | 2/2004 | Rothberg |
| 6,754,021 B2 | 6/2004 | Kisaka et al. |
| 6,807,630 B2 | 10/2004 | Lay et al. |
| 6,909,574 B2 | 6/2005 | Aikawa et al. |
| 6,968,450 B1 | 11/2005 | Rothberg et al. |
| 7,017,037 B2 | 3/2006 | Fortin et al. |
| 7,028,174 B1 | 4/2006 | Atai-Azimi et al. |
| 7,082,494 B1 | 7/2006 | Thelin et al. |
| 7,107,444 B2 | 9/2006 | Fortin et al. |
| 7,120,806 B1 | 10/2006 | Codilian et al. |
| 7,142,385 B2 | 11/2006 | Shimotono et al. |
| 7,334,082 B2 | 2/2008 | Grover et al. |
| 7,395,452 B2 | 7/2008 | Nicholson et al. |
| 7,411,757 B2 | 8/2008 | Chu et al. |
| 7,461,202 B2 | 12/2008 | Forrer, Jr. et al. |
| 7,472,222 B2 | 12/2008 | Auerbach et al. |
| 7,477,477 B2 | 1/2009 | Maruchi et al. |
| 7,509,471 B2 | 3/2009 | Gorobets |
| 7,516,346 B2 | 4/2009 | Pinheiro et al. |
| 7,610,438 B2 | 10/2009 | Lee et al. |
| 7,613,876 B2 | 11/2009 | Bruce et al. |
| 7,644,231 B2 | 1/2010 | Recio et al. |
| 7,685,360 B1 | 3/2010 | Brunnett et al. |

(Continued)

OTHER PUBLICATIONS

Hannes Payer, Marco A.A. Sanvido, Zvonimir Z. Bandic, Christoph M. Kirsch, "Combo Drive: Optimizing Cost and Performance in a Heterogeneous Storage Device", http://csl.cse.psu.edu/wish2009_papers/Payer.pdf, Mar. 7, 2009.

(Continued)

*Primary Examiner* — Andrew L Sniezek

(57) ABSTRACT

A hybrid drive is disclosed comprising a disk channel including a head actuated over a disk, the disk comprising a plurality of data sectors, and a non-volatile semiconductor memory (NVSM) comprising a plurality of memory segments. Write commands are received from a host, wherein the write commands comprise write data. When a frequency of the write data exceeds a threshold, an operating mode of the disk channel is changed to change a power consumption rate of the disk channel.

12 Claims, 8 Drawing Sheets

(56) References Cited

U.S. PATENT DOCUMENTS

| | | | |
|---|---|---|---|
| 7,752,491 | B1 | 7/2010 | Liikanen et al. |
| 8,315,006 | B1 * | 11/2012 | Chahwan et al. ............... 360/75 |
| 2006/0195657 | A1 | 8/2006 | Tien et al. |
| 2007/0168624 | A1 * | 7/2007 | Kaler ........................... 711/154 |
| 2008/0040537 | A1 | 2/2008 | Kim |
| 2008/0059694 | A1 | 3/2008 | Lee |
| 2008/0130156 | A1 | 6/2008 | Chu et al. |
| 2008/0177938 | A1 | 7/2008 | Yu |
| 2008/0222353 | A1 | 9/2008 | Nam et al. |
| 2008/0256287 | A1 | 10/2008 | Lee et al. |
| 2008/0307270 | A1 | 12/2008 | Li |
| 2009/0019218 | A1 | 1/2009 | Sinclair et al. |
| 2009/0031072 | A1 | 1/2009 | Sartore |
| 2009/0103203 | A1 | 4/2009 | Yoshida |
| 2009/0106518 | A1 | 4/2009 | Dow |
| 2009/0144501 | A2 | 6/2009 | Yim et al. |
| 2009/0150599 | A1 | 6/2009 | Bennett |
| 2009/0172324 | A1 | 7/2009 | Han et al. |
| 2009/0249168 | A1 | 10/2009 | Inoue |
| 2009/0271562 | A1 | 10/2009 | Sinclair |
| 2009/0327603 | A1 | 12/2009 | McKean et al. |
| 2010/0088459 | A1 | 4/2010 | Arya et al. |

OTHER PUBLICATIONS

Gokul Soundararajan, Vijayan Prabhakaran, Mahesh Balakrishan, Ted Wobber, "Extending SSD Lifetimes with Disk-Based Write Caches", http://research.microsoft.com/pubs/115352/hybrid.pdf, Feb. 2010.

Xiaojian Wu, A. L. Narasimha Reddy, "Managing Storage Space in a Flash and Disk Hybrid Storage System", http://www.ee.tamu.edu/~reddy/papers/mascots09.pdf, 2009.

Tao Xie, Deepthi Madathil, "Sail: Self-Adaptive File Reallocation on Hybrid Disk Arrays", The 15th Annual IEEE International Conference on High Performance Computing (HiPC 2008), Bangalore, India, Dec. 17-20, 2008.

Non-Volatile Memory Host Controller Interface revision 1.0 specification available for download at http://www.intel.com/standards/nvmhci/index.htm. Ratified on Apr. 14, 2008, 65 pages.

\* cited by examiner

HYBRID DRIVE CHANGING POWER MODE OF DISK CHANNEL WHEN FREQUENCY OF WRITE DATA EXCEEDS A THRESHOLD

BACKGROUND

Hybrid drives are conventional disk drives augmented with a non-volatile semiconductor memory (NVSM) such as a flash which helps improve certain aspects of the disk drive. For example, the non-volatile semiconductor memory may store boot data in order to expedite the boot operation of a host computer. Another use of a NVSM may be to store frequently accessed data and/or non-sequential data for which the access time is typically much shorter than the disk (which suffers from mechanical latency including seek and rotational latency). Other policies may reduce write amplification of the NVSM in order to maximize its longevity, such as storing frequently written data to the disk (or data having a write/read ratio that exceeds a predetermined threshold).

DETAILED DESCRIPTION OF EMBODIMENTS OF THE INVENTION

Figures 1A, 1B:
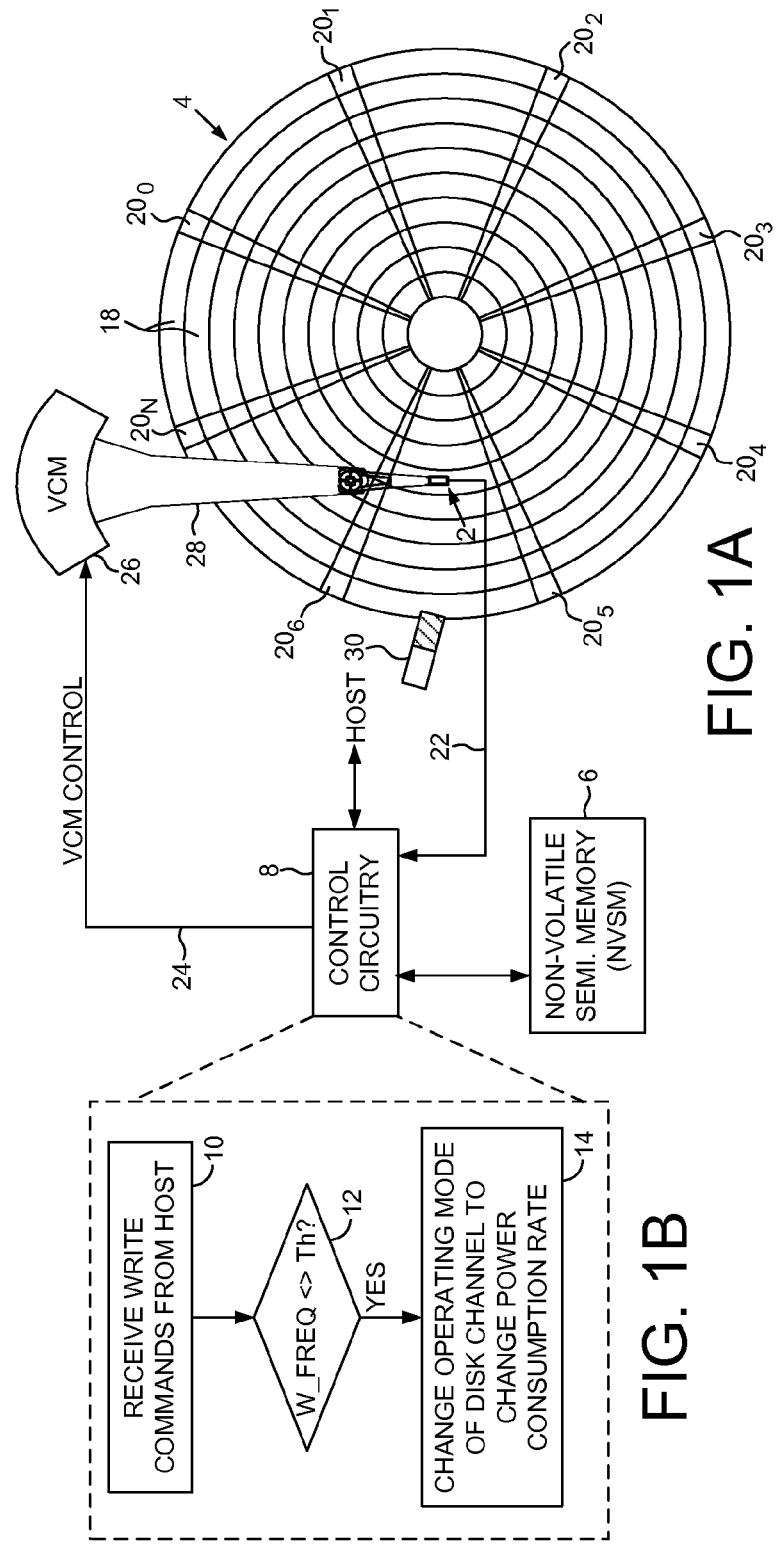
FIG. 1A shows a hybrid drive according to an embodiment of the present invention comprising a head actuated over a disk, and a non-volatile semiconductor memory (NVSM).
FIG. 1B is a flow diagram according to an embodiment of the present invention wherein when a frequency of write data exceeds a threshold, a power mode of the disk channel is adjusted.

FIG. 1A shows a hybrid drive according to an embodiment of the present invention comprising a disk channel including a head 2 actuated over a disk 4, the disk 4 comprising a plurality of data sectors, and a non-volatile semiconductor memory (NVSM) 6 comprising a plurality of memory segments. The disk drive further comprises control circuitry 8 operable to execute the flow diagram of FIG. 1B, wherein write commands are received from a host (step 10), the write commands comprise write data. When a frequency of the write data exceeds a first threshold (step 12), an operating mode of the disk channel is changed to change a power consumption rate of the disk channel (step 14).

In the embodiment of FIG. 1A, the disk 4 comprises a plurality of servo sectors $20_0$-$20_N$ that define a plurality of data tracks 18, wherein each data track comprises a plurality of the data sectors. The control circuitry 8 processes a read signal 22 to demodulate the servo sectors $20_0$-$20_N$ into a position error signal (PES). The PES is filtered with a suitable compensation filter to generate a control signal 24 applied to a voice coil 26 of a voice coil motor (VCM) which pivots an actuator arm 28 about a pivot to position the head 2 radially over the disk 4 in a direction that reduces the PES. A spindle motor (not shown) rotates the disk 4 so that an air bearing forms between the head 2 and the disk 4. Prior to spinning down the disk 4, the head 2 is parked on a ramp 30 located near an outer edge of the disk 4.

When the disk 4 is spun up and the head 2 is being servoed over the disk 4 in response to the servo sectors, the power consumption rate of the disk channel is relatively high. Accordingly, in one embodiment of the present invention illustrated in the flow diagram of FIG. 2A, when write commands are received from the host (step 10) the write commands are serviced by both the NVSM and the disk channel (step 32). When a frequency of write data serviced by the disk channel falls below a threshold (step 34), the operating mode of the disk channel is changed in order to decrease the power consumption rate of the disk channel (step 36). While the disk channel is in the lower power mode, write commands received from the host are serviced by the NVSM (step 38).

In one embodiment, the frequency of the write data that is evaluated corresponds to an amount of write data received from the host over a timer interval. In this embodiment, the frequency of the write data may fall below the threshold even though the frequency of write commands received from the host may be relatively high (i.e., receiving a number of write commands with a small amount of write data). In another embodiment, the frequency of the write data may correspond to a number of write commands received from the host over a time interval.

The operating mode of the disk channel may be changed in any suitable manner in order to decrease the power consumption rate. In an embodiment shown in the flow diagram of FIG. 2B, the disk channel may be configured into a lower power mode by disabling the servoing of the head in response to the servo sectors, or unloading the head onto the ramp, or decreasing the spin rate of the disk, or spinning down the disk (step 36A). In one embodiment, each operating mode may provide a different level of power savings, wherein unloading the head and spinning down the disk provides the most power savings.

Figure 3A:
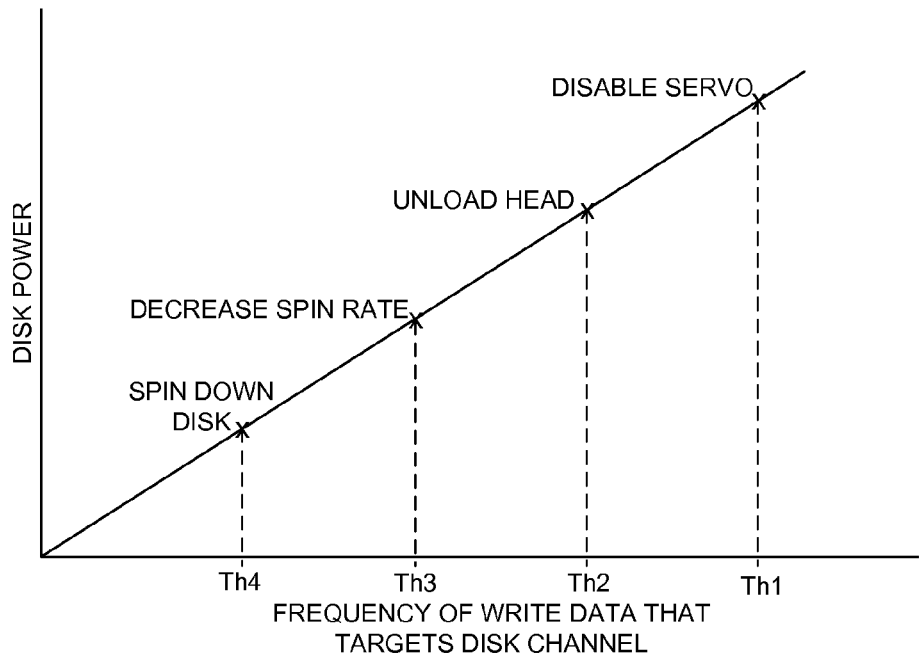
FIG. 3A shows an embodiment of the present invention wherein the operating mode of the disk channel is adjusted to further decrease the power consumption rate as the frequency of write data targeted to the disk channel (but serviced by the NVSM) decreases.

FIG. 3A shows an embodiment of the present invention illustrating various operating modes and the corresponding reduction in the power consumption rate, wherein in one embodiment the operating mode is adjusted to further decrease the power consumption rate relative to the frequency of write data that is targeted to the disk channel (but serviced by the NVSM). In this embodiment, when servicing write commands using the disk channel and the frequency of write data serviced by the disk channel falls below a first threshold, the disk channel is configured into the first power mode by disabling the servoing of the head in response to the servo sectors. While in the lower power mode, subsequent write commands are serviced by the NVSM including write commands that would otherwise have been serviced using the disk channel. That is, when a write command is received that is targeted to the disk channel, but the disk channel is in a low power mode, the write data is instead written to the NVSM. When the frequency of the write data targeted to the disk channel falls below a second threshold (lower than the first threshold), the operating mode of the disk channel is changed (e.g., unload the head) to further reduce the power consumption rate. The power mode of the disk channel is further reduced as the frequency of the write data targeted to the disk channel falls further until the disk is eventually spun down as shown in FIG. 3A.

In one embodiment, the power mode of the disk channel is not incrementally increased (i.e., reversing FIG. 3A) as the frequency of the write data targeted to the disk channel increases. Instead, the disk channel is configured into an active operating mode (highest power mode) in order to service a new write command based on any suitable condition being met, such as the frequency of write data targeted to the disk channel exceeding a threshold. In another embodiment described below, the disk channel may be brought out of the low power mode in order to service a write command that has a high weighting toward the disk channel as determined by a suitable migration policy.

Figure 3B:
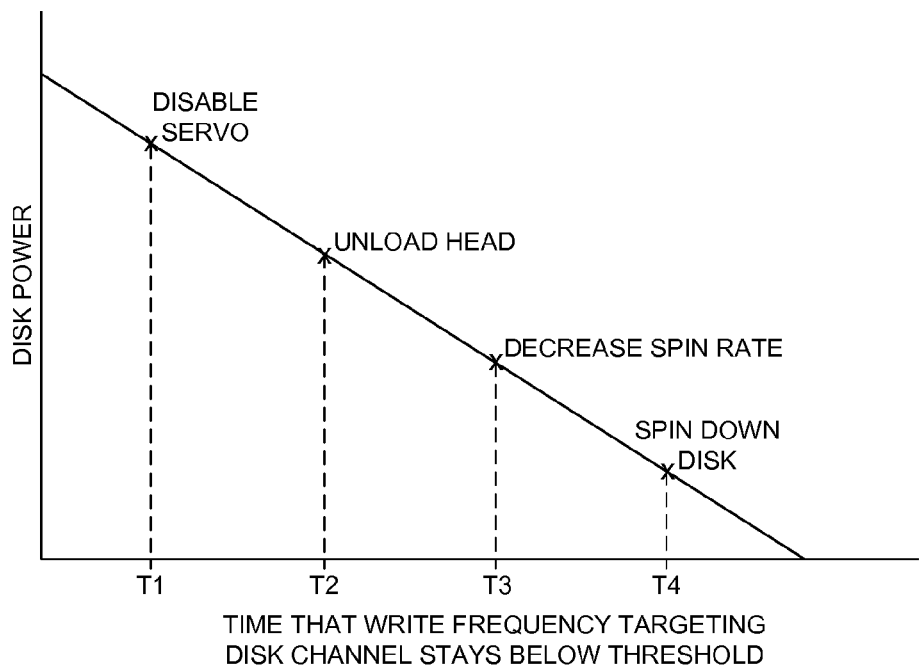
FIG. 3B shows an embodiment of the present invention wherein the operating mode of the disk channel is adjusted to further decrease the power consumption rate as the frequency of write data targeted to the disk channel (but serviced by the NVSM) remains below a threshold for an extended interval.

FIG. 3B shows an alternative embodiment of the present invention wherein the power mode of the disk channel is reduced when the frequency of write data targeted to the disk channel falls below a first threshold at time T1. If the frequency of the write data targeted to the disk channel (but serviced by the NVSM) remains under the first threshold, the power mode of the disk channel is reduced further at time T2 until ultimately spinning down the disk at time T4.

Figure 4:
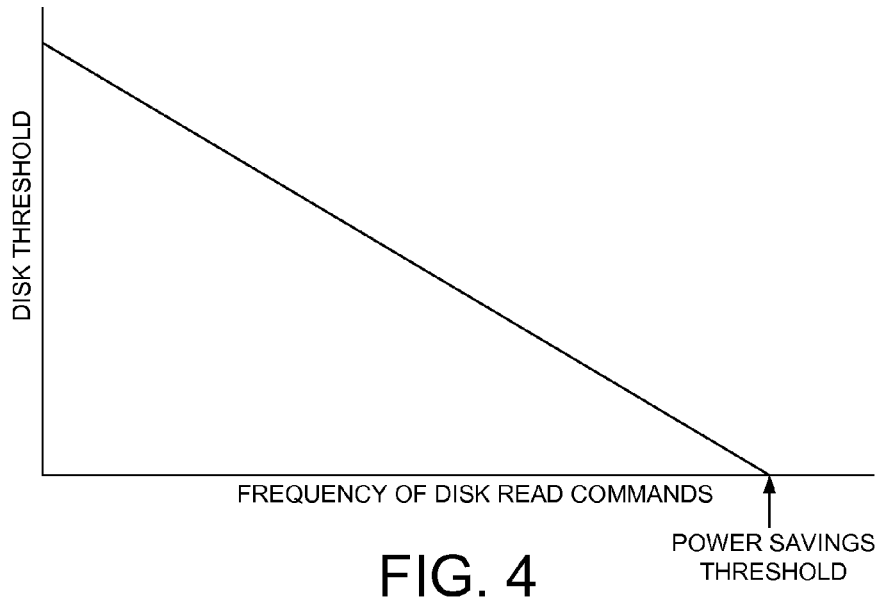
FIG. 4 shows an embodiment of the present invention wherein the threshold for adjusting the operating mode of the disk channel is adjusted relative to a frequency of read commands serviced by the disk channel.

If read commands are being received from the host that must be serviced using the disk channel, there is no power savings in reducing the power mode of the disk channel relative to the frequency of write data since the disk channel will need to be brought out of the lower power mode to service the read commands. Accordingly, in one embodiment shown in FIG. 4, the write frequency threshold for changing the operating mode of the disk channel is adjusted relative to a frequency of read commands serviced by the disk channel. In this embodiment, the frequency of read commands serviced by the disk channel must fall below a threshold in order to achieve any power savings. If the frequency of read commands does not fall below this threshold, the disk channel is not configured into a low power mode regardless as to the frequency of write data. When the frequency of read commands falls below this threshold, the disk channel is configured into a lower power mode when the frequency of write data falls below the disk threshold. The disk threshold is increased (making it easier to enter the lower power mode) as the frequency of read commands serviced by the disk channel decreases as illustrated in FIG. 4.

Figure 5:
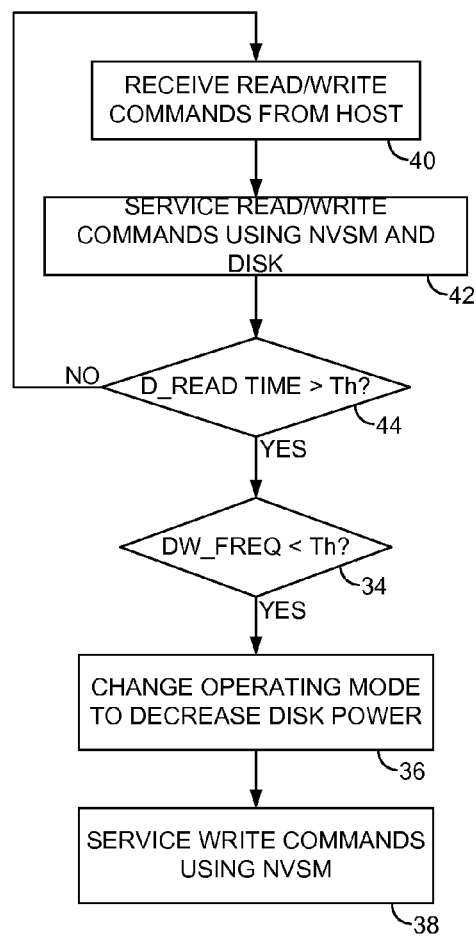
FIG. 5 is a flow diagram according to an embodiment of the present invention wherein when a time interval since the last read command serviced by the disk channel exceeds a threshold, the frequency of the write data is evaluated to determine whether to adjust the operating mode of the disk channel.

FIG. 5 is a flow diagram according to an alternative embodiment of the present invention wherein read and write commands received from the host (step 40) are serviced by the NVSM and the disk channel (step 42). When a time interval since the disk channel serviced a previous read command exceeds a threshold (step 44), the frequency of the write data is evaluated to adjust the operating mode. That is, the frequency of the write data is not used to adjust the operating mode until the time interval since the last disk read command exceeds a threshold.

Figure 2A:
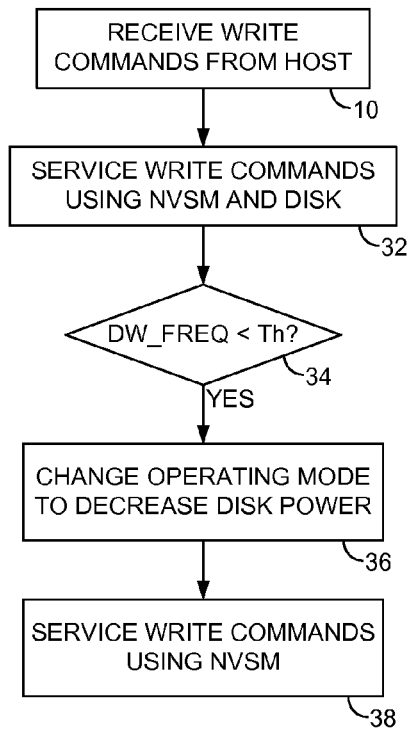
FIG. 2A is a flow diagram according to an embodiment of the present invention wherein when a frequency of write data serviced by the disk channel falls below a threshold, an operating mode of the disk channel is adjusted to decrease a power consumption rate of the disk channel.
Figure 2B:
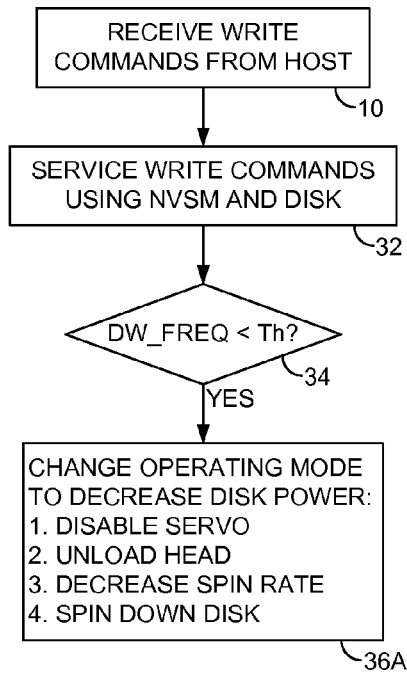
FIG. 2B is a flow diagram according to an embodiment of the present invention wherein the operating mode of the disk channel is configured into one of a plurality of operating modes that decreases the power consumption rate of the disk channel.
Figure 6:
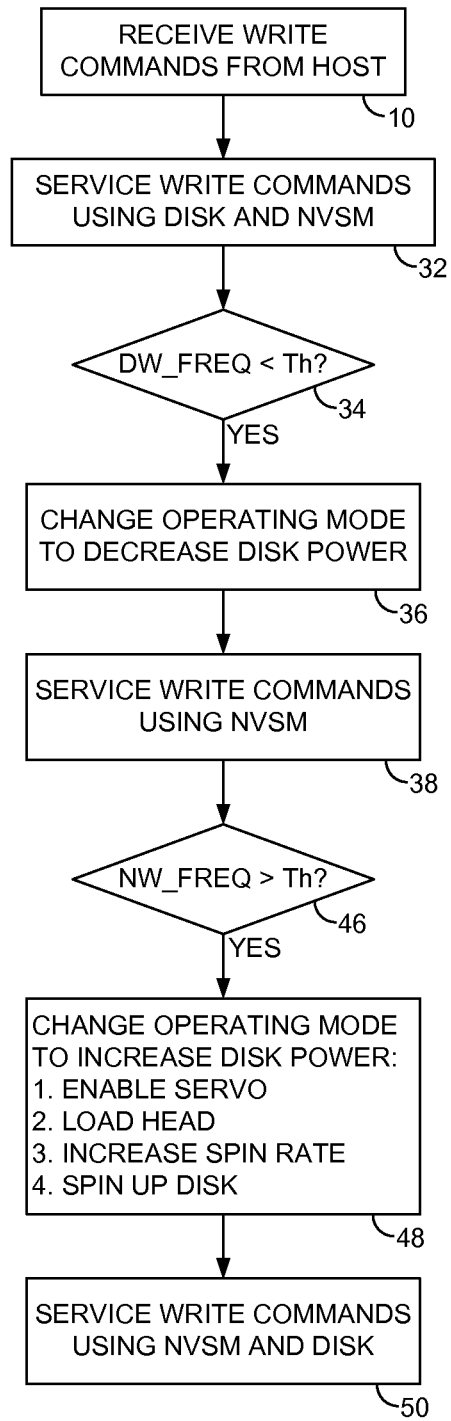
FIG. 6 is a flow diagram according to an embodiment of the present invention wherein while the disk channel is in a lower power mode, the frequency of write data targeted to the disk channel (but serviced by the NVSM) is evaluated to determine when to increase the power mode of the disk channel.

FIG. 6 is a flow diagram that extends on the flow diagram of FIG. 2A wherein while the disk channel is in a lower power mode, the frequency of write data targeted to the disk channel (but serviced using the NVSM) is monitored. If the frequency exceeds a threshold (step 46), the operating mode of the disk channel is changed to increase the power consumption rate of the disk channel (step 48). In one embodiment, the operating mode is changed to increase the power consumption rate incrementally without coming completely out of the lower power modes. For example, the disk may be spun up without loading the head off the ramp onto the disk. If the frequency of the write data targeted to the disk channel remains the same or increases, the disk channel is configured into the active operating mode (highest power mode) so that the write commands may be serviced using the disk channel (step 50). In another embodiment, the disk channel is configured into the active operating mode as soon as the frequency of write data targeted to the disk channel exceeds the threshold at step 46. In these embodiments, taking the disk channel out of the lower power mode to eventually begin servicing write commands helps conserve the life and free space of the NVSM.

Figure 7:
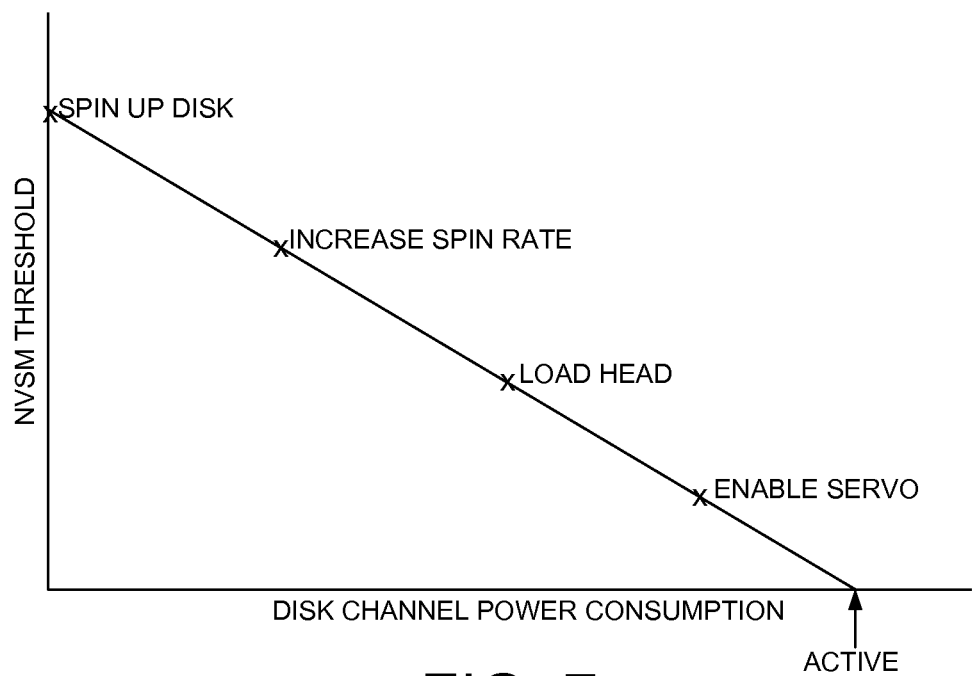
FIG. 7 shows an embodiment of the present invention wherein the write frequency threshold for bringing the disk channel out of a low power mode is adjusted based on the current power mode of the disk channel.

FIG. 7 shows an embodiment of the present invention wherein the threshold at step 46 of FIG. 6 is adjusted relative to a current operating mode of the disk channel. For example, if the disk channel is configured into the lowest power mode (disk spun down), the threshold at step 46 is increased so that a higher frequency of write data targeted to the disk channel is required to bring the disk channel out of the lower power mode. In these embodiments, since it takes more power to bring the disk channel out of lower power modes, the threshold at step 46 is adjusted relative to the amount of power needed to activate the disk channel. The more power required, the higher the threshold, or the longer the frequency of write data must remain above a fixed threshold, before bringing the disk channel out of the low power mode.

Figure 8A:
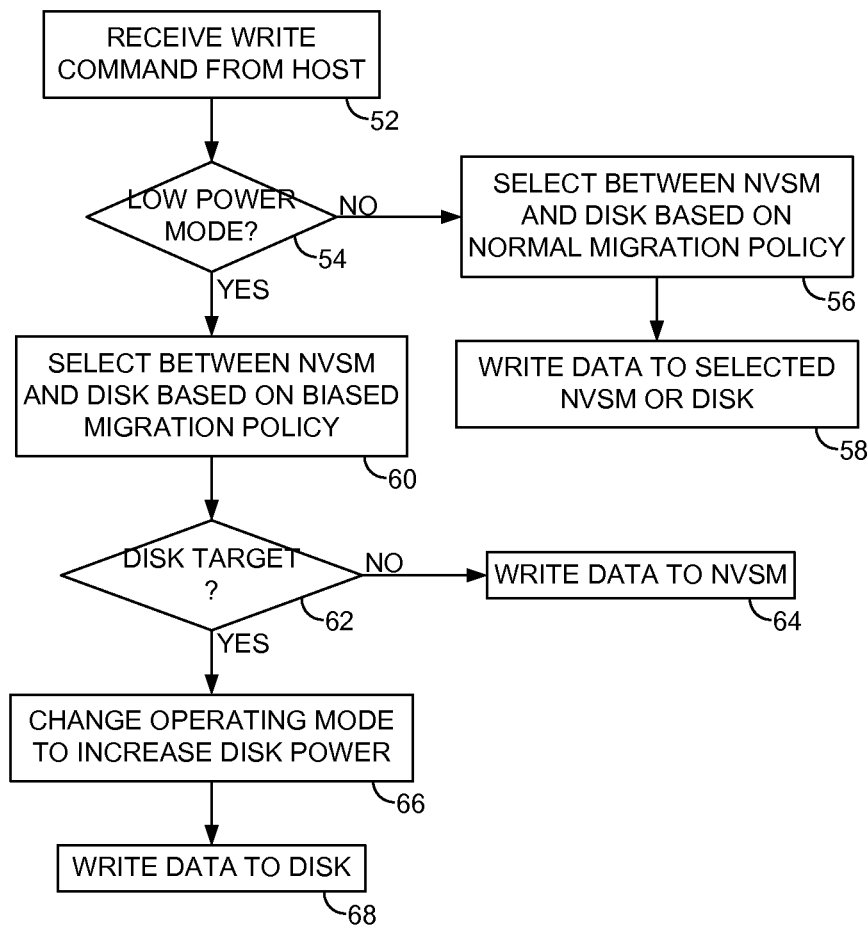
FIG. 8A is a flow diagram according to an embodiment of the present invention wherein when the disk channel is in a low power mode, a biased migration policy is executed to determine whether to bring the disk channel out of the low power mode.

FIG. 8A is a flow diagram according to an embodiment of the present invention wherein when a write command is received from the host (step 52) the operating mode of the disk channel is evaluated (step 54). If the disk channel is active (not in a low power mode), then a normal migration policy is used to select between the NVSM and the disk channel (step 56), and the write data written to the selected channel (step 58). The normal migration policy may select between the NVSM and the disk channel based on any suitable factor(s). For example, write commands identifying sequentially written data sectors may be better suited to the disk channel, whereas write commands identifying randomly written data sectors may be better suited to the NVSM. Another factor may be a ratio of writes/reads for a logical block address (LBA), wherein a low ratio of writes/reads with a high frequency of reads may bias the migration toward the NVSM whereas a high ratio of writes/reads may bias the migration toward the disk channel. The migration policy may consider multiple factors simultaneously with a specific weighting applied to each factor.

If the disk channel is in a low power mode when a write command is received (step 54), a biased migration policy is used to select between the NVSM and the disk channel (step 60). The biased migration policy is biased toward selecting the NVSM to write the data, and therefore may select the NVSM over the disk channel even though the normal migration policy would have selected the disk channel. When the biased migration policy selects the NVSM, the data is written to the NVSM (step 64). However, the biased migration policy may still select the disk channel to write the data if the characteristics of the write command weigh heavily toward selecting the disk channel (e.g., a write command identifying a long sequence of consecutive data sectors). Accordingly, if the biased migration policy selects the disk channel (step 62), the disk channel is brought out of the low power mode (step 66) and the data written to the disk (step 68).

Figure 8B:
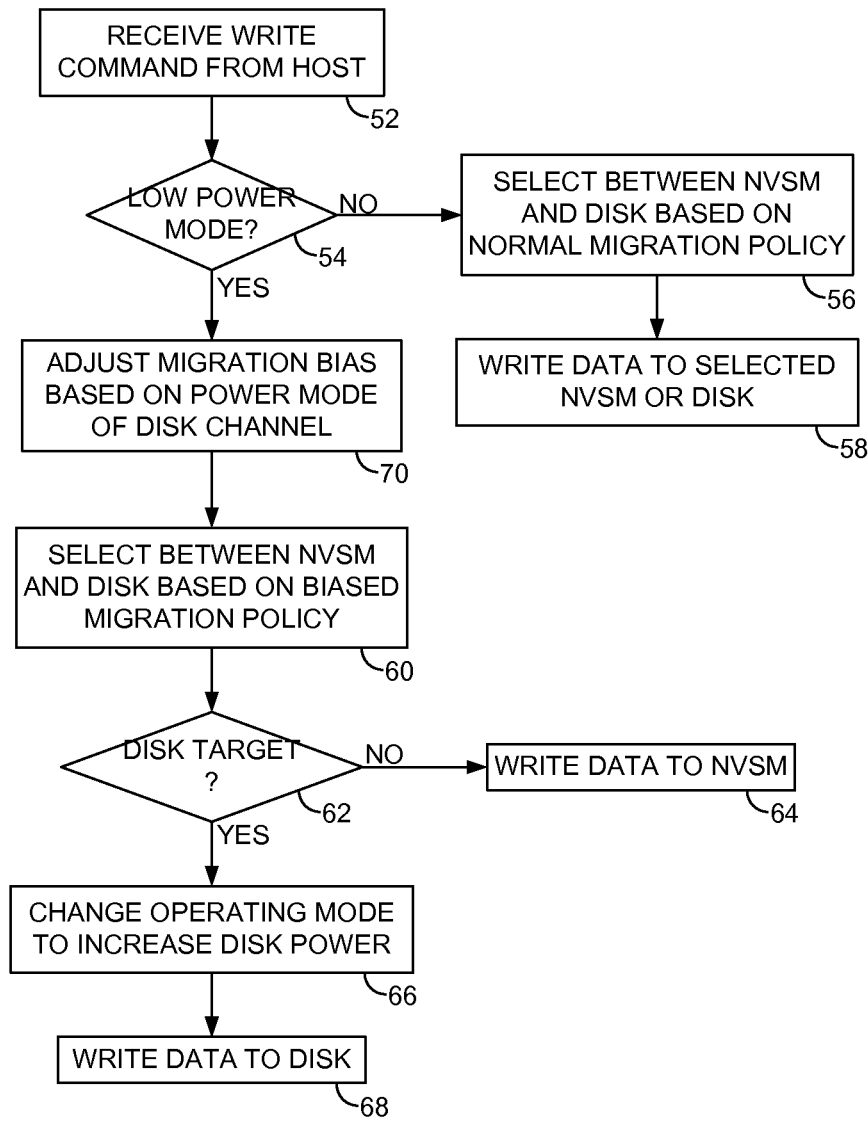
FIG. 8B is a flow diagram according to an embodiment of the present invention wherein the bias of the migration policy is adjusted based on the current power mode of the disk channel.

FIG. 8B is a flow diagram according to an embodiment of the present invention that extends on the flow diagram of FIG. 8A, wherein when a write command is received from the host (step 52) and the disk channel is in a lower power mode (step 54), the bias of the migration policy is adjusted based on the power mode of the disk channel (step 70). The lower the power mode (meaning the more power required to activate the disk channel), the higher the bias toward the NVSM. For example, when the disk is spun down, the migration policy is heavily biased toward selecting the NVSM since spinning up the disk and loading the head requires a significant amount of power. Accordingly, the write command should be heavily biased toward the disk channel before expending the energy needed to activate the disk channel.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller and/or NVSM controller, or certain steps described above may be performed by a read channel and others by a disk controller and/or NVSM controller. In one embodiment, the read channel and controllers are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the hybrid drive is powered on. In yet another embodiment, the control circuitry comprises suitable logic circuitry, such as state machine circuitry.

What is claimed is:

1. A hybrid drive comprising:
a disk channel comprising a head actuated over a disk, the disk comprising a plurality of data sectors;
a non-volatile semiconductor memory (NVSM) comprising a plurality of memory segments; and
control circuitry operable to:
receive write commands from a host, wherein the write commands comprise write data; and
when a frequency of the write data based on a frequency of write data serviced by the disk channel falls below a first threshold, adjust an operating mode of the disk channel to a lower power mode to decrease the power consumption rate of the disk channel;
wherein the control circuitry is further operable to:
service write commands using the NVSM while the disk channel is in the lower power mode; and
adjust the operating mode of the disk channel to further decrease the power consumption rate of the disk channel when the frequency of write data targeted to the disk channel and serviced by the NVSM falls below a second threshold.

2. A hybrid drive comprising:
a disk channel comprising a head actuated over a disk, the disk comprising a plurality of data sectors;
a non-volatile semiconductor memory (NVSM) comprising a plurality of memory segments; and
control circuitry operable to:
receive write commands from a host, wherein the write commands comprise write data; and
when a frequency of the write data based on a frequency of write data serviced by the disk channel falls below a first threshold, adjust an operating mode of the disk channel to a lower power mode to decrease the power consumption rate of the disk channel;
wherein control circuitry is further operable to adjust the operating mode of the disk channel to further decrease the power consumption rate of the disk channel when the frequency of write data targeted to the disk channel and serviced by the NVSM remains below the first threshold for a time interval.

3. A hybrid drive comprising:
a disk channel comprising a head actuated over a disk, the disk comprising a plurality of data sectors;
a non-volatile semiconductor memory (NVSM) comprising a plurality of memory segments; and
control circuitry operable to:
receive write commands from a host, wherein the write commands comprise write data; and
when a frequency of the write data based on a frequency of write data serviced by the disk channel falls below a first threshold, adjust an operating mode of the disk channel to a lower power mode to decrease the power consumption rate of the disk channel;
wherein the control circuitry is further operable to adjust the first threshold based on a frequency of read commands serviced by the disk channel.

4. A hybrid drive comprising:
a disk channel comprising a head actuated over a disk, the disk comprising a plurality of data sectors;
a non-volatile semiconductor memory (NVSM) comprising a plurality of memory segments; and
control circuitry operable to:
receive write commands from a host, wherein the write commands comprise write data; and
when a frequency of the write data based on a frequency of write data serviced by the disk channel falls below a first threshold, adjust an operating mode of the disk channel to a lower power mode to decrease the power consumption rate of the disk channel;
wherein the control circuitry is further operable to adjust the operating mode of the disk channel when a time interval since the disk channel serviced a previous read command exceeds a second threshold and when the frequency of write data serviced by the disk channel falls below the first threshold.

5. A hybrid drive comprising:
a disk channel comprising a head actuated over a disk, the disk comprising a plurality of data sectors;
a non-volatile semiconductor memory (NVSM) comprising a plurality of memory segments; and
control circuitry operable to:
receive write commands from a host, wherein the write commands comprise write data; and
when a frequency of the write data exceeds a first threshold, change an operating mode of the disk channel to change a power consumption rate of the disk channel;
wherein the control circuitry is further operable to:
select between the NVSM and disk channel to service a write command based on a normal migration policy when the disk channel is in a first operating mode;
select between the NVSM and the disk channel to service the write command based on a biased migration policy when the disk channel is in a second operating mode; and
adjust a bias of the biased migration policy based on the operating mode of the disk channel.

6. The hybrid drive as recited in claim 5, wherein the control circuitry is further operable to increase a likelihood of selecting the NVSM to service the write command as the power consumption rate of the disk channel decreases.

7. A method of operating a hybrid drive comprising a disk channel comprising a head actuated over a disk, the disk comprising a plurality of data sectors, and a non-volatile semiconductor memory (NVSM) comprising a plurality of memory segments, the method comprising:
receiving write commands from a host, wherein the write commands comprise write data;
when a frequency of the write data based on a frequency of write data serviced by the disk channel falls below a first threshold, adjusting an operating mode of the disk channel to a lower power mode to decrease a power consumption rate of the disk channel;
servicing write commands using the NVSM while the disk channel is in the lower power mode; and
adjusting the operating mode of the disk channel to further decrease the power consumption rate of the disk channel when the frequency of write data targeted to the disk channel and serviced by the NVSM falls below a second threshold.

8. A method of operating a hybrid drive comprising a disk channel comprising a head actuated over a disk, the disk comprising a plurality of data sectors, and a non-volatile semiconductor memory (NVSM) comprising a plurality of memory segments, the method comprising:
receiving write commands from a host, wherein the write commands comprise write data;
when a frequency of the write data based on a frequency of write data serviced by the disk channel falls below a first threshold, adjusting an operating mode of the disk channel to a lower power mode to decrease a power consumption rate of the disk channel;
servicing write commands using the NVSM while the disk channel is in the lower power mode; and
adjusting the operating mode of the disk channel to further decrease the power consumption rate of the disk channel when the frequency of write data targeted to the disk channel and serviced by the NVSM remains below the first threshold for a time interval.

9. A method of operating a hybrid drive comprising a disk channel comprising a head actuated over a disk, the disk comprising a plurality of data sectors, and a non-volatile semiconductor memory (NVSM) comprising a plurality of memory segments, the method comprising:
receiving write commands from a host, wherein the write commands comprise write data;
when a frequency of the write data based on a frequency of write data serviced by the disk channel falls below a first threshold, adjusting an operating mode of the disk channel to a lower power mode to decrease a power consumption rate of the disk channel;
servicing write commands using the NVSM while the disk channel is in the lower power mode; and
adjusting the first threshold based on a frequency of read commands serviced by the disk channel.

10. A method of operating a hybrid drive comprising a disk channel comprising a head actuated over a disk, the disk comprising a plurality of data sectors, and a non-volatile semiconductor memory (NVSM) comprising a plurality of memory segments, the method comprising:
receiving write commands from a host, wherein the write commands comprise write data;
when a frequency of the write data based on a frequency of write data serviced by the disk channel falls below a first threshold, adjusting an operating mode of the disk channel to a lower power mode to decrease a power consumption rate of the disk channel;
servicing write commands using the NVSM while the disk channel is in the lower power mode; and
adjusting the operating mode of the disk channel when a time interval since the disk channel serviced a previous read command exceeds a second threshold and when the frequency of write data serviced by the disk channel falls below the first threshold.

11. A method of operating a hybrid drive comprising a disk channel comprising a head actuated over a disk, the disk comprising a plurality of data sectors, and a non-volatile semiconductor memory (NVSM) comprising a plurality of memory segments, the method comprising:
receiving write commands from a host, wherein the write commands comprise write data;
when a frequency of the write data exceeds a first threshold, changing an operating mode of the disk channel to change a power consumption rate of the disk channel;
selecting between the NVSM and disk channel to service a write command based on a normal migration policy when the disk channel is in a first operating mode;
selecting between the NVSM and the disk channel to service the write command based on a biased migration policy when the disk channel is in a second operating mode; and
adjusting a bias of the biased migration policy based on the operating mode of the disk channel.

12. The method as recited in claim 11, further comprising increasing a likelihood of selecting the NVSM to service the write command as the power consumption rate of the disk channel decreases.

* * * * *